US012143415B1

(12) United States Patent
Mandal et al.

(10) Patent No.: US 12,143,415 B1
(45) Date of Patent: Nov. 12, 2024

(54) LARGE SCALE ASSET EVALUATION AND PROBING

(71) Applicant: Amazon Technologies, Inc., Seattle, WA (US)

(72) Inventors: Debasish Mandal, Bengaluru (IN); Vineeth Reddy Surendra, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 236 days.

(21) Appl. No.: 17/953,194

(22) Filed: Sep. 26, 2022

(51) Int. Cl.
*H04L 9/40* (2022.01)
*G06F 9/445* (2018.01)

(52) U.S. Cl.
CPC ...... *H04L 63/1433* (2013.01); *G06F 9/44526* (2013.01)

(58) Field of Classification Search
CPC .................. H04L 63/1433; G06F 9/44526
See application file for complete search history.

(56) References Cited

U.S. PATENT DOCUMENTS

| 7,562,369 | B1* | 7/2009 | Salamone | G06F 9/54 |
| | | | | 719/331 |
| 8,578,000 | B2* | 11/2013 | Van Wie | H04N 21/00 |
| | | | | 709/250 |
| 9,117,106 | B2 | 8/2015 | Dedeoglu et al. | |
| 9,235,928 | B2 | 1/2016 | Medioni et al. | |
| 9,473,747 | B2 | 10/2016 | Kobres et al. | |
| 2010/0257539 | A1* | 10/2010 | Narayanan | G06F 9/54 |
| | | | | 719/311 |
| 2012/0204142 | A1* | 8/2012 | Rubenstein | G06F 8/65 |
| | | | | 717/173 |
| 2013/0284806 | A1 | 10/2013 | Margalit | |
| 2018/0322136 | A1* | 11/2018 | Carpentier | G06F 16/188 |
| 2022/0058036 | A1* | 2/2022 | Wang | G06F 9/44526 |
| 2022/0247784 | A1* | 8/2022 | Satish | H04L 63/0281 |

* cited by examiner

*Primary Examiner* — Michael Won
(74) *Attorney, Agent, or Firm* — Lee & Hayes, P.C.

(57) ABSTRACT

Systems and techniques for detecting vulnerabilities and exploits within network assets in a near real-time manner. The systems provide for scanning and probing assets within an organization network based on determined or disclosed exploits from the wild. The system provides for digital risk protection that actively and passively hunts for potential organizational threats and vulnerabilities and generates alerts in real-time related to the detected exploits. The systems provide a platform for generating plugins to scan for the detected exploits and fingerprint assets for services hosted and potential vulnerabilities.

18 Claims, 7 Drawing Sheets

LARGE SCALE ASSET EVALUATION AND PROBING

BACKGROUND

An enterprise network may often comprise many connected assets such as desktop workstations, servers, laptops, tablets, and other devices that are used during the regular course of business. Each asset may introduce a source of vulnerability for the enterprise network, especially if it is accessible from outside of the enterprise network. Over time, the assets within the enterprise network may be removed, added, or changed, and some of the assets may be used outside of the enterprise network. A cloud-based security management system may be deployed to monitor and promote the security of the enterprise network. For example, the security management system may assess vulnerabilities of particular assets within the network as well as the network as a whole.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Described herein are, among other things, techniques, devices, and systems, for scanning and probing assets to identify services with vulnerabilities that can be addressed or mediated before spreading or causing network security incidents. In particular, a Security Operations Center (SOC) may encounter situations where the SOC needs to find organization owned or run assets with specific characteristics, such as particular services with vulnerabilities or other such characteristics. For example, the SOC may wish to identify assets within the network running content management systems, or a specific content management system. The SOC may also wish to identify assets running vulnerable versions of any service, including those for which a third-party scanning tool may not have coverage.

Typical systems for detecting vulnerabilities or identifying assets running potentially vulnerable services are limited and may not be capable of detecting specific versions of a service, such as a specific version of a content management system or plugin that is detectable with the present system. Additionally, publicly exposed zero-day exploits may eventually be resolved and patched by a service provider and may be scanned by third-party tools using service signatures from the service providers but such systems require substantial time to implement, leaving the network and assets vulnerable between detection of the exploit and the resolution. The systems and techniques described herein provide for immediate coverage and detection of any publicly exposed vulnerabilities, without having to wait for service providers or third-party scanning tools to respond and react. The systems and techniques described herein additionally provide for customization to detect specific assets, services, or components within the network based on fully customizable factors and parameters. Furthermore, the systems and techniques described herein enable scanning of large numbers of assets across a large network with rapid speed as network engineers may control a number or parallel threads to scan.

The systems and techniques described herein provide for an external threat hunting platform that actively and passively hunts for potential organization relevant threats, vulnerabilities, leaks, and secrets and is capable of alerting the SOC in real-time. The platform enables network engineers to quickly generate a custom probe based on publicly discovered and/or disclosed vulnerabilities and send the custom probe to some or all assets within the organization to fingerprint the assets and determine the potential spread of the vulnerability within the organization. In addition, the network engineers can send to probe to target subsets of assets and may also send assets over any transport application layer protocol (e.g., TCP, UDP, ICMP, HTTP, FTP, SSH, etc.). The platform enables publicly posted or disclosed exploits and/or vulnerabilities to be detected and/or identified in organization assets without requiring signature data from service providers. Accordingly, the network engineers may use the platform to minimize exploit signature dependency on third-party vendors and can refer to the publicly posted exploit information with the platform to develop a plugin to probe the entire and/or subsets of the assets owned by the organization.

Because scans developed and implemented using the platform described herein are focused and highly specific to the particular vulnerability, scans can be accomplished quickly, even across large organizations with large numbers of assets running various services. The platform may be hosted in the cloud such that asset scanning loads may be handled by the infrastructure itself such that network operators need not worry about parallel thread management.

Figure 1:
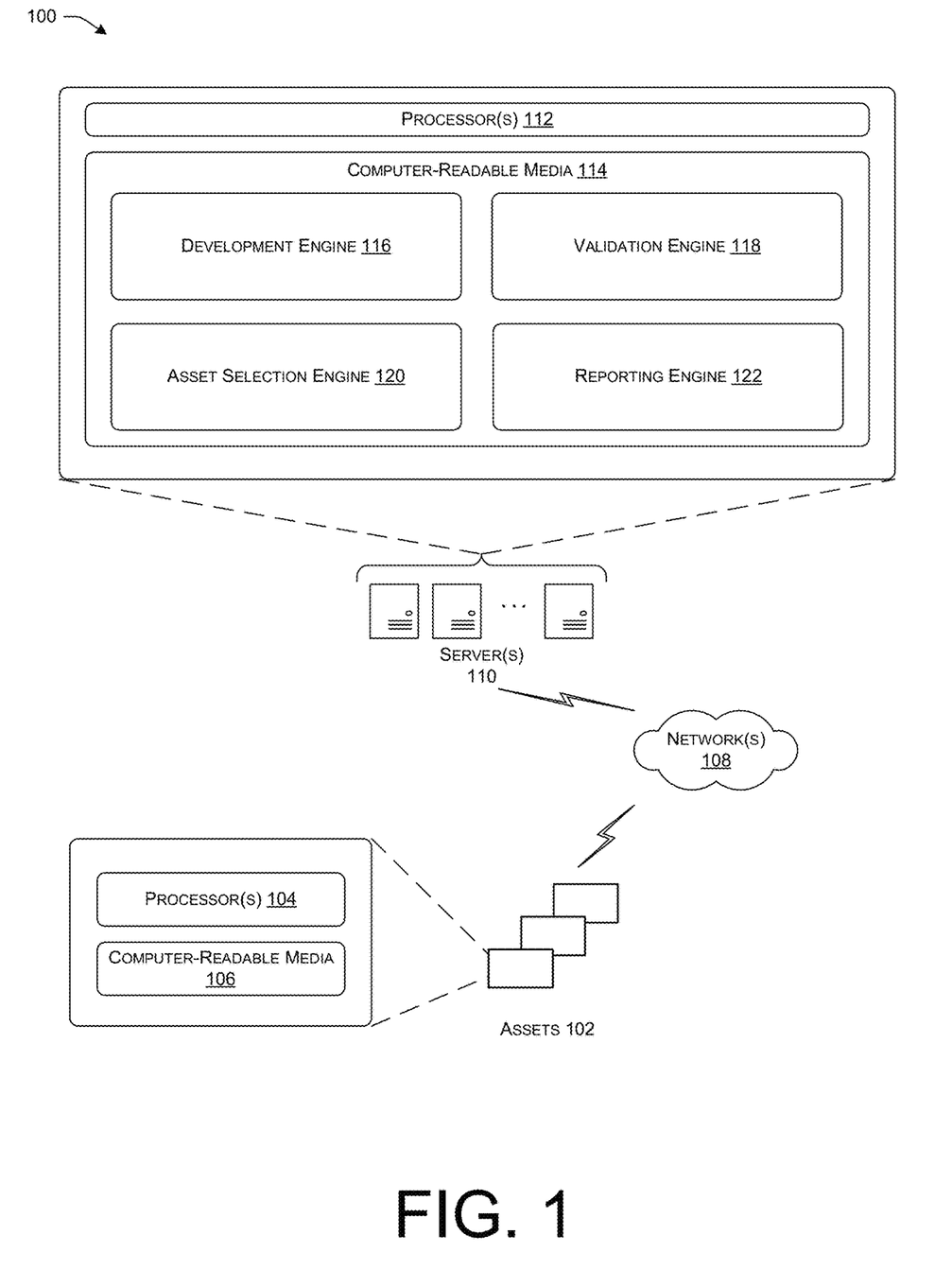
FIG. 1 illustrates an example environment for scanning network assets for exposed exploits, according to at least some examples.

FIG. 1 illustrates an example environment 100 for scanning network assets for exposed exploits, according to the present description. More particularly, the example environment 100 may be used to generate plugins and perform scans using said plugins to fingerprint organizational assets and identify exposed vulnerabilities across network assets. Though FIG. 1 is shown having particular modules and elements, other modules, components, or elements may be used to accomplish the techniques associated therewith. The fingerprinting that may be performed may include identifying different services running on different assets, versions of systems, identifying particular code, identifying licenses associated with the code (e.g., such as to identify code under particular licenses, open source, or from other sources that may be running within services).

As shown in FIG. 1, the example environment 100 may include one or more one or more assets 102 associated with the example environment 100 such as servers, computers, networking components, and other such devices. The example environment 100 further includes one or more network(s) 108 and one or more servers 110. The assets 102 may include processor(s) 104 and computer-readable media 106 for carrying out instructions from one or more services or other components. The server 110 may also include one or more processor(s) 112 and computer-readable media 114, which may include a development engine 116, a validation engine 118, an asset selection engine 120, and a reporting engine 122.

In various embodiments, the server 110 may be part of a network, a cloud-based service, a service provider, a service, or any number of servers or entities that may provide products and services, such as described herein.

The processor(s) 104 of the assets 102 may execute one or more modules and/or processes to cause the assets 102 to perform a variety of functions. In some embodiments, the processor(s) 104 may include a central processing unit (CPU), a graphics processing unit (GPU), both CPU and GPU, or other processing units or components known in the art. Additionally, each of the processor(s) 104 may possess its own local memory, which also may store program modules, program data, and/or one or more operating systems.

In at least one configuration, the computer-readable media 106 of the assets 102 may include any components that may be used to receive, access, or perform actions according to services hosted thereon. Depending on the exact configuration and type of the asset, the computer-readable media 106 may also include volatile memory (such as RAM), non-volatile memory (such as ROM, flash memory, miniature hard drive, memory card, or the like), or some combination thereof.

In some embodiments, the network(s) 108 may be any type of network known in the art, such as the Internet. Moreover, the assets 102 and the server 110 may communicatively couple to the network(s) 108 in any manner, such as by a wired or wireless connection. The network(s) 108 may also facilitate communication between the assets 102 and the server 110.

The server 110 may include the one or more processor(s) 112 and the computer-readable media 114. The server 110 may also include additional components not listed above that may perform any function associated with the server 110. In various embodiments, the server 110 may be any type of server, such as a network-accessible server, and may be one of multiple servers included in a server cluster or server farm. In other embodiments, the processor(s) 112 and the computer-readable media 114 of the server 110 may be the same as, similar to, or different from the processor(s) 112 and the computer-readable media 114, respectively, of the assets 102.

The development engine 116 may be used to facilitate generation of a plugin to scan assets for services. The development engine may be part of a platform that is used by a network engineer to hunt for potential organization relevant threats, vulnerabilities, leaks, and secrets and is capable of alerting the SOC in real-time. The platform enables network engineers to quickly generate a custom probe based on publicly discovered and/or disclosed vulnerabilities and send the custom probe to some or all assets within the organization to fingerprint the assets and determine the potential spread of the vulnerability within the organization. In addition, the network engineers can send to probe to target subsets of assets and may also send assets over any transport application layer protocol (e.g., TCP, UDP, ICMP, HTTP, FTP, SSH, etc.).

The development engine 116 may include a user interface (UI) through which the network engineer may input information related to the exploit and/or vulnerability as described herein. For instance, exploits and/or vulnerabilities may be identified based on publicly posted disclosures of discovered exploits. The platform may not require signature data from service providers. Accordingly, the network engineers may use the platform to minimize exploit signature dependency on third-party vendors and can refer to the publicly posted exploit information with the platform to develop a plugin to probe the entire and/or subsets of the assets owned by the organization.

The UI may include a web-based UI that may include options to upload information related to the exploit and generate a plugin and/or module that can be used by the platform to scan assets within the network. In some examples, the development engine 116 may be configured to automate generation of a plugin for identifying the exploit and/or services within assets using the platform. The development engine 116 may be configured to receive a standard format of the exploit and then may generate code for the plugin that imports the exploit information regarding the applicable service and portion of code of the service.

In some examples, the plugin and/or module may include a target protocol over which a probe is sent to target. For instance, the protocol may include TCP, UDP, RAW, or other such protocols. The module may also include a target service that identifies the service to which the probe will be sent within the network. For example, the target service may include HTTPS, FTP, SSH, RDP, and other such services. The module may also include a class, the main class describing the core functionality of the module. The plugin may also include a main function invoked by the platform for scanning. The plugin may also include return values of the main function. The return values may include a list of values expected to see in a final report generated by the platform, such as shown and described with respect to FIG. 3 below.

The validation engine 118 may be used to validate the plugin generated by the development engine 116. The validation may be performed by parsing the plugin to verify if the plugin is written correctly to run on the platform. The validation engine 118 may be configured to estimate and/or simulate performance of the scanning and ensure that the plugin will operate correctly on the platform.

The asset selection engine 120 may be configured to select assets within the network of the organization. Asset selection engine 120 may iterate through a predefined list of assets that are added to the platform and/or network for monitoring. The platform may, via the asset selection engine 120, reuse information (e.g. open ports, services running, etc.) about an asset collected when the asset was added to the network and/or platform for monitoring. The asset selection engine 120 may also additionally verify if the service targeted by the plugin is running on the target asset.

If the asset selection engine 120 finds the target service running on an asset, one of the scanning threads of the platform may send a probe to the asset and save the details of how the asset responded to the probe. The probe may probe how the asset behaves, and in particular how the targeted service and/or vulnerability within the service behaves and responds to the probe. In some examples, such information may be used to identify whether the vulnerability is present within the service based on the response from the asset and/or service.

Because scans developed and implemented using the platform described herein are focused and highly specific to the particular vulnerability, scans can be accomplished quickly, even across large organizations with large numbers of assets running various services. The platform may be hosted in the cloud such that asset scanning loads may be handled by the infrastructure itself such that network operators need not worry about parallel thread management.

The reporting engine 122 may prepare a report once all asset scanning is done within the network. The reporting engine 122 may prepare a standard report, such as may be available in a CSV file and may be available for download and/or available through the web-based UI. The platform hosting the development engine 116, the validation engine 118, the asset selection engine 120, and the reporting engine 122 consumes the plugin and may launch a customizable and/or required number of scanning thread to send probes to a predefined list of assets. When scanning is done, the reporting engine 122 generates a report which summarizes the findings of how each and every asset has responded to the probe that was sent.

In some examples, a network engineer may quickly identify assets and verify the asset's response in the report and find out necessary information from it. The plugin may use information collected about the asset when the asset was added to the network for monitoring. In such examples, the platform need not perform port and/or service discovery during runtime. Also, the plugins are specific and directed to particular exploits and vulnerabilities such that scans are extremely fast.

Figure 2:
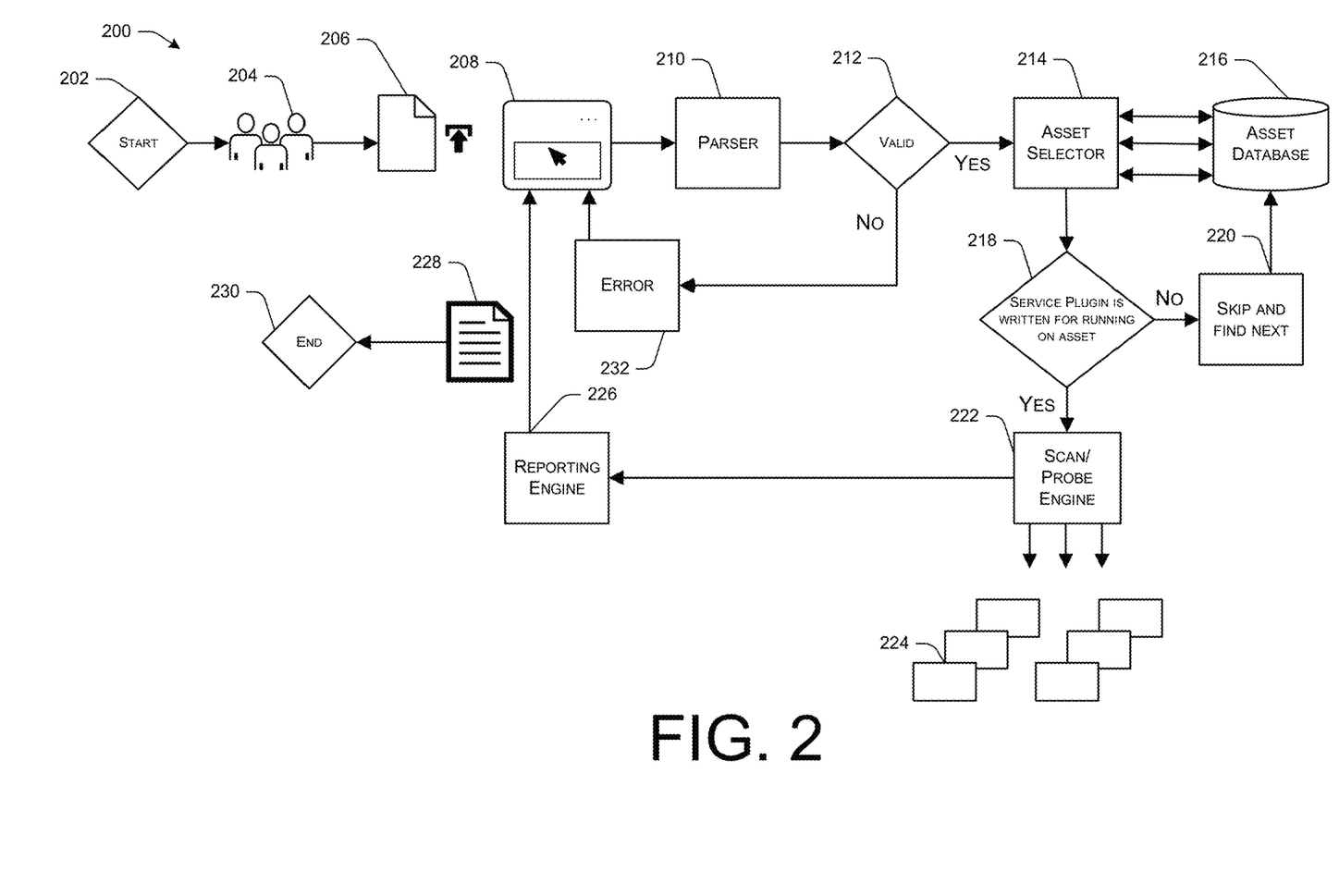
FIG. 2 illustrates an example flowchart depicting a high-level design of a platform for implementing asset scanning, according to at least some examples.

FIG. 2 illustrates an example flowchart depicting a high-level design of a platform 200 for implementing asset scanning, according to at least some examples. In an example, the platform 200 is used to identify assets running services and/or particular code including exploits or vulnerabilities. At 202, the platform may be used to start a process of identifying and fingerprinting assets across a network to identify publicly disclosed vulnerabilities and/or exploits. In some examples, at 202, the platform may be implemented in response to notification of an exploit, which may be performed by manually inputting data by a network engineer 204 regarding the exploit and/or by implementing a machine learning model that generates a plugin, as described herein.

The platform 200 may enable generation of a plugin 206 using a software development kit. The plugin 206 may be generated based on and in response to the exploit described in a public disclosure. A network engineer 204 may write the plugin using a configured software development kit and may subsequently upload the plugin 206 to a web-based UI 208 associated with the platform that enables access to the network assets.

After uploading to the web-based UI 208, the platform 200 may verify the plugin 206 by first passing the plugin through a parser 210. The parser 210 may parse the plugin code for the purpose of identifying one or more attributes or execution paths for the plugin. The parser 210 may be configured to identify particular fields and verify that the plugin is written to evaluate a particular service or exploit such as known to be associated with malware in the potential services.

At 212, the platform 200 may determine that the plugin is valid or invalid based on the parser 210. In the event that the parser 210 determines that the plugin is not valid, an error 232 may be returned to the web-based UI 208 where the user may read the notification and change one or more parameters of the plugin 206 before re-uploading for validation. The error 232 may describe one or more characteristics or faults in the code of the plugin preventing execution of the plugin to properly identify the exploit.

At 214, after the platform 200 determines that the plugin 206 is valid, the platform may select assets using the asset selector 214 for scanning the asset based on the plugin information. The asset selector 214 may select one or more assets from the asset database 216, the asset database 216 describing one or more entries associated with network assets describing services running thereon and return data from a probe of the asset. The asset database 216 may be updated and/or maintained based on scans as well as information provided to the platform 200 when the particular asset was added to the network. The asset selector 214 may select one or more assets simultaneously based on a number of parallel threads.

The platform 200 may evaluate each asset from the asset database 216 for whether the service or vulnerability targeted by the plugin is running on the particular asset at 218. If the asset is not running the particular service targeted by the plugin, then the platform 200 may skip scanning the asset at 220 and find a next asset to scan.

If the asset is running the particular service targeted by the plugin, then the platform may proceed to the scan/probe engine 222. The scan/probe engine 222 may evaluate the assets 226 using the plugin 206. In particular, after determining, based on the asset database 216 whether the asset includes the targeted service, the scan/probe engine 222 sends a probe to the asset and saves the response to the probe.

After scanning and probing the assets 224, the platform 200 generates a report 228 using the reporting engine 226, such as shown and described with respect to FIG. 1. The report may summarize how each asset responded to the probe as well as the scan of whether the asset includes the targeted service that is probed. The report 228 is available through the web-based UI 208 for viewing and interacting by the network engineer 204.

The network engineer 204 may quickly verify the response in the report and may respond to the information accordingly. For example, the platform 200 may enable the network engineer 204 to disable one or more assets or services based on the report 228. For example, the platform 200 may disable a portion of the targeted service or asset based on the response from the probe, for example when the response from the probe indicates a presence of the exploit or vulnerability. In some examples, the platform 200 may automatically take action against the exploit by disabling the exploited or vulnerable code of the service hosted on the asset automatically. In some examples, the network engineer 204 may implement one or more firewall rules based on the report 228, for example to block external communications based on the report 228. For instance, the firewall rules may restrict or block communications from vulnerable assets or systems to external sources and destinations.

Figure 3:
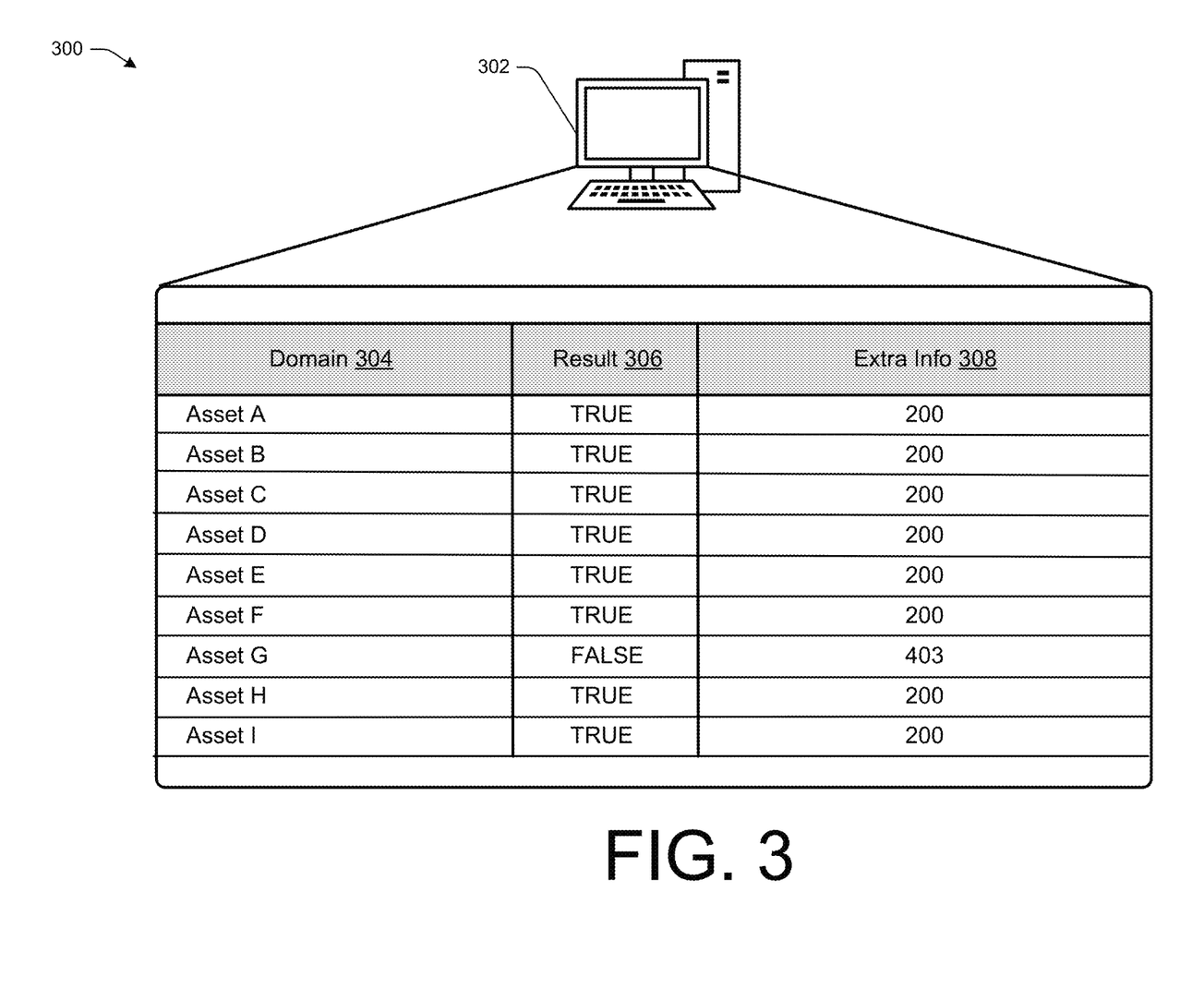
FIG. 3 illustrates an example of an asset database including entries for various databases, presence of targeted services, and data related to a response to the probe, according to at least some examples.

FIG. 3 illustrates an example of an asset database 300 including entries for various databases, presence of targeted services, and data related to a response to the probe, according to at least some examples. The asset database 300 is hosted on a server 302 and/or cloud-based server system, such as the server 110 of FIG. 1. The asset database 300 includes entries related to the domain 304, result 306, and extra information 308.

The domain 304 may include a listing or reference to a particular asset, such as a server, computing device, or other computing device. The result 306 may be related to plugin and may relate to whether the asset listed in the entry includes the targeted service described in the disclosed exploit. The result 306 may include a binary indication of whether the service is included or not at the asset. The extra information 308 may include results of the probe sent to the asset from the plugin to test the exploit and/or vulnerability. The probe may determine the presence of the exploit and/or whether the exploit exists in the same manner as described in the disclosed vulnerability report. The extra information 308 may be customizable through a web-based UI and/or through a plugin to present or probe extra information as customized by a network engineer. The extra information 308 may include HTTP response codes, SSL certificate expirations, probe data, and other such information in some examples.

In an example, a plugin may be written with reference to a particular vulnerability, such as with respect to the Grafana Path Traversal Vulnerability (ref. no. CVE-2021-43798). The vulnerability was disclosed publicly on Dec. 8, 2021 with conventional vulnerability assessment tools unable to detect the vulnerability until Dec. 9, 2021, leaving a large window for the vulnerability to leave the network exploited or accessible by malignant actors. Accordingly, with the present example, at the time of the disclosure on the $8^{th}$ of December, the platform 200 may be used to generate a plugin and scan network assets for the vulnerability without delay, thereby significantly shortening the window during which the vulnerability is active.

Figure 4:
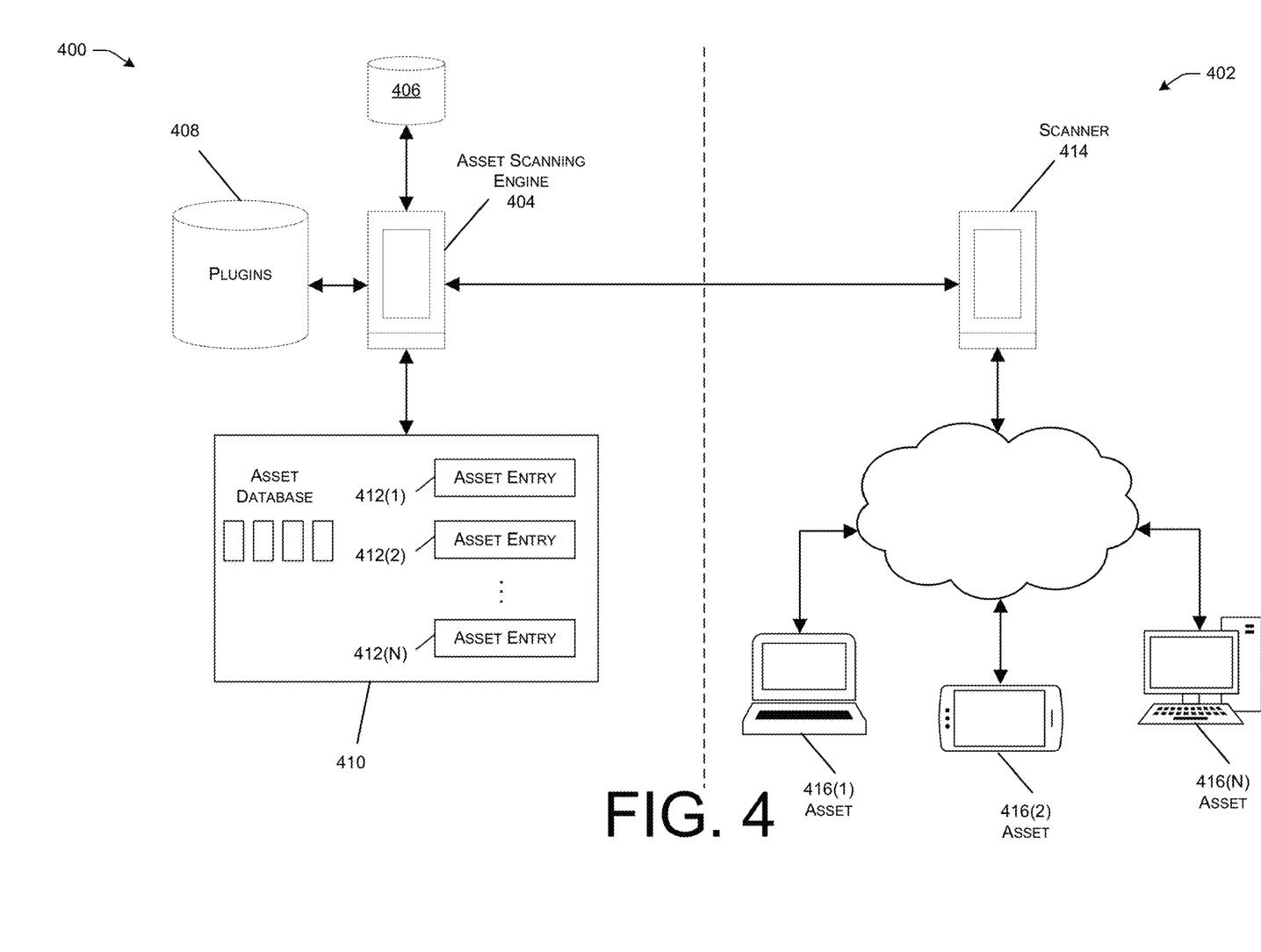
FIG. 4 shows a block diagram illustrating a security management system operable to collect asset data regarding a disclosed vulnerability from an organization network.

FIG. 4 shows a block diagram illustrating a security management system 400 operable to collect asset data regarding a disclosed vulnerability from an organization network 402. The security management system 400 may be provided remotely from the organization network 402. For example, the security management system 400 may be distributed over a cloud computing environment and may provide cloud-based network security to the organization network 402. In some embodiments, the security management system 400 and the organization network 402 may be collocated. The security management system 400 may be provided as part of an SOC, as described herein.

The organization network 402 may have a plurality of assets 416(1), 416(2), 416(N), which may comprise desktop workstations, servers, laptops, tablets, mobile phones, and other devices. The assets 416 may also comprise virtual machines or computing instances that are hosted from external cloud-based services (e.g., Amazon EC2, Microsoft Azure), within the organization network 402, or any combination thereof.

A scanner 414 may be deployed to scan and collect data about the assets 416 and services within the organization network 402. While FIG. 4 shows the scanner 414 located at the organization network 402, the scanner 414 may also be located remotely, such as within the security management system 400. Remote scanners may be suitable for scanning publicly facing devices (e.g., web servers), whereas local scanners (e.g., the scanner 414 of FIG. 4) may be well-positioned to detect vulnerabilities within a private network.

The scanner 414 may gather network topology data that provides a list of the assets 416 within the organization network 402, such as the asset database 216 of FIG. 2. The scanner 414 may further receive or otherwise determine attributes and other information about the assets 416. For example, the scanner 414 may periodically target the assets 416 within the organization network 402 to determine vulnerability information or to monitor policy compliance. The scanner 414 may relay collected data to the security management system 400 in packets or other functional groupings of information that will hereafter be referred to as data chunks.

A data chunk may be most useful if it is known to relate to a particular asset 416. For example, if a data chunk reveals a detected vulnerability, it would be valuable for a network security administrator to know which asset 416 possesses the detected vulnerability. In the simplest systems, a single identifying attribute could be used, where the identifying attribute is unique to each asset 416 within the system, constant over time, and included in each data chunk associated with all of the assets 416.

In accordance with the principles described herein, the security management system 400 may comprise an asset scanning engine 404 and an asset database 410 in communication with one another. The asset scanning engine 404 may analyze the assets 416 according to the plugins described herein to identify services run on the assets 416, and particularly services associated with the disclosed vulnerabilities. The asset database 410 may include the information shown and described with respect to FIG. 3, for example with asset entries 412(1), 412(2), and 412(N) corresponding to asset entries associated with the assets 416(1), 416(2), and 416(N), respectively.

The security management system 400 may host the platform 200 and the web-based UI 206 described with respect to FIG. 2. Accordingly, the asset scanning engine 404 and/or the scanner 414 may perform the functions of the platform 200, including enabling generation of the plugin, validation of the plugin, determining assets including the target service, and evaluating the services for the disclosed vulnerabilities.

Figure 5:
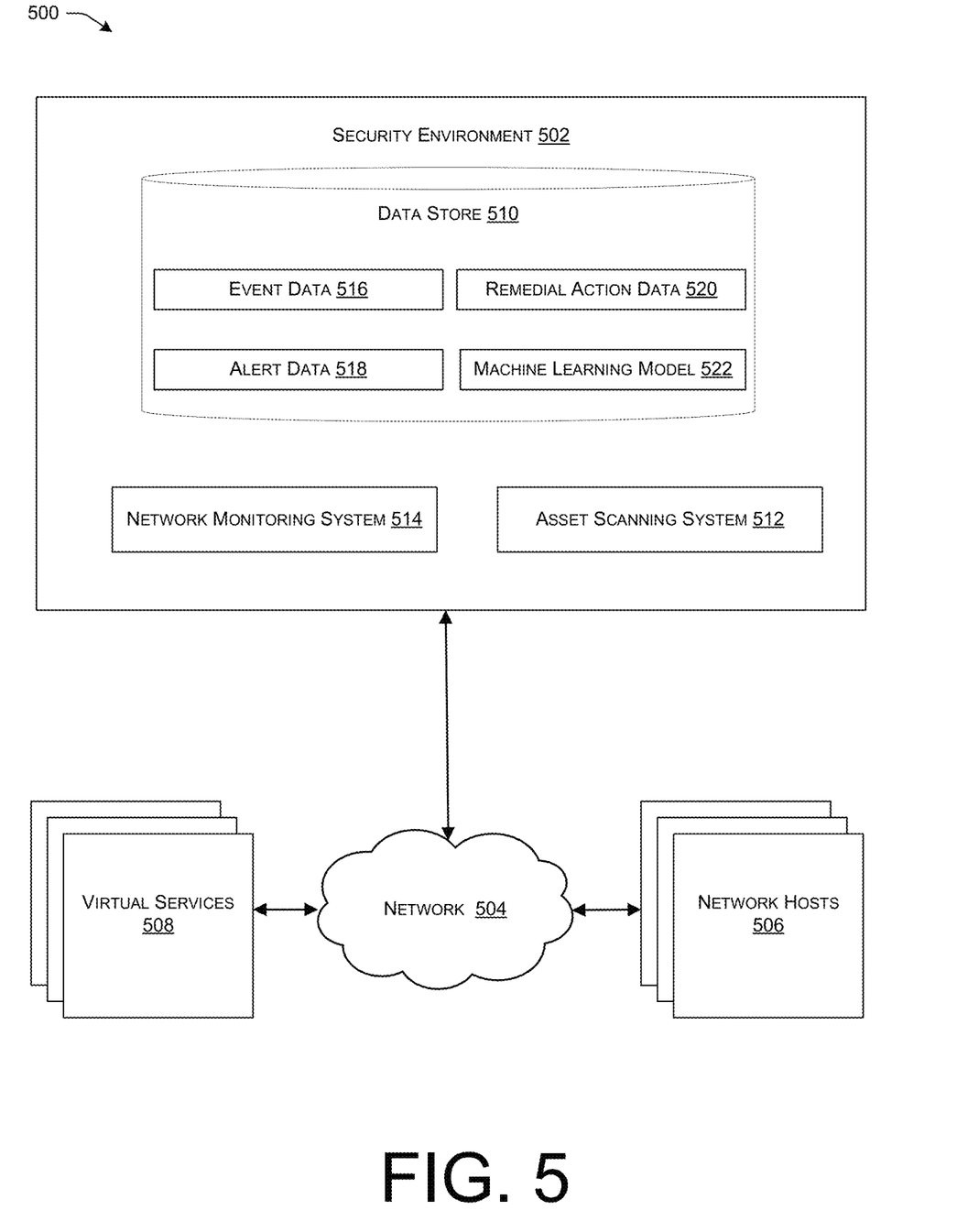
FIG. 5 illustrates a networked environment for evaluating assets and services within the networked environment for vulnerabilities, according to at least some examples.

FIG. 5 illustrates a networked environment for evaluating assets and services within the networked environment for vulnerabilities, according to at least some examples. The networked environment 500 includes a security environment 502 and a plurality of network hosts 506, which are in data communication with each other via a network 504. The network 504 includes, for example, the Internet, intranets, extranets, wide area networks (WANs), local area networks (LANs), wired networks, wireless networks, cable networks, satellite networks, or other suitable networks, etc., or any combination of two or more such networks.

The security environment 502 may comprise, for example, a server computer or any other system providing computing capability. Alternatively, the security environment 502 may employ a plurality of computing devices that may be arranged, for example, in one or more server banks or computer banks or other arrangements. Such computing devices may be located in a single installation or may be distributed among many different geographical locations. For example, the security environment 502 may include a plurality of computing devices that together may comprise a hosted computing resource, a grid computing resource, and/or any other distributed computing arrangement. In some cases, the security environment 502 may correspond to an elastic computing resource where the allotted capacity of processing, network, storage, or other computing-related resources may vary over time.

Various applications and/or other functionality may be executed in the security environment 502 according to various embodiments. Also, various data is stored in a data store 510 that is accessible to the security environment 502. The data store 510 may be representative of a plurality of data stores 510 as can be appreciated. The data stored in the data store 510, for example, is associated with the operation of the various applications and/or functional entities described below.

The components executed on the security environment 502, for example, include an asset scanning system 512, a network monitoring system 514, and other applications, services, processes, systems, engines, or functionality not discussed in detail herein. The network monitoring system 514 is executed to monitor various aspects of operation of the network 504 and/or the network hosts 506. In this regard, the network monitoring system 514 may function monitor assets and services available within the organization. The asset scanning system 512 may scan the assets based on provided plugins and information related to exposed vulnerabilities. To this end, the asset scanning system 512 may be executed to scan assets for detected vulnerabilities and exploits as described herein.

It is noted that the security environment 502 may be operated as a service on behalf of external entities and organizational units. In such cases, the asset scanning system 512 and network monitoring system 514 may be executed on external systems and communicate with the security environment 502 via the network 504.

The data stored in the data store 510 includes, for example, event data 516, alert data 518, remedial action data 520, a machine learning model 522, and potentially other data. The event data 516 may include a stream of events generated by the network monitoring system 514 and may also include services and actions carried out by assets of the network.

The alert data 518 includes alerts related to whether the assets include services identified as potentially vulnerable as determined by the platform 200 and plugin 204. The alerts may include scans of the assets based on the services available at each as well as the results of the probes sent to each of the assets as described herein.

The remedial action data 520 includes remedial actions recommended or automatically implemented by the platform 200 based upon the generated alerts. The remedial action data 520 may also track manually initiated remedial actions that are initiated by users in response to alerts.

The machine learning model 522 is developed by using vulnerabilities publicly disclosed and plugins developed for detecting such vulnerabilities. Moreover, the machine learning model 522 may be continually updated and refined based upon the continued operation of the platform 200 and the network monitoring system 514 and manual interventions in those systems.

The network hosts 506 are representative of a plurality of client or server devices that may be coupled to the network 504. The network hosts 506 may comprise, for example, a processor-based system such as a computer system. Such a computer system may be embodied in the form of a server, a router, a firewall, a desktop computer, a laptop computer, personal digital assistants, cellular telephones, smartphones, set-top boxes, music players, web pads, tablet computer systems, game consoles, electronic book readers, voice interface devices, or other devices.

Figure 6:
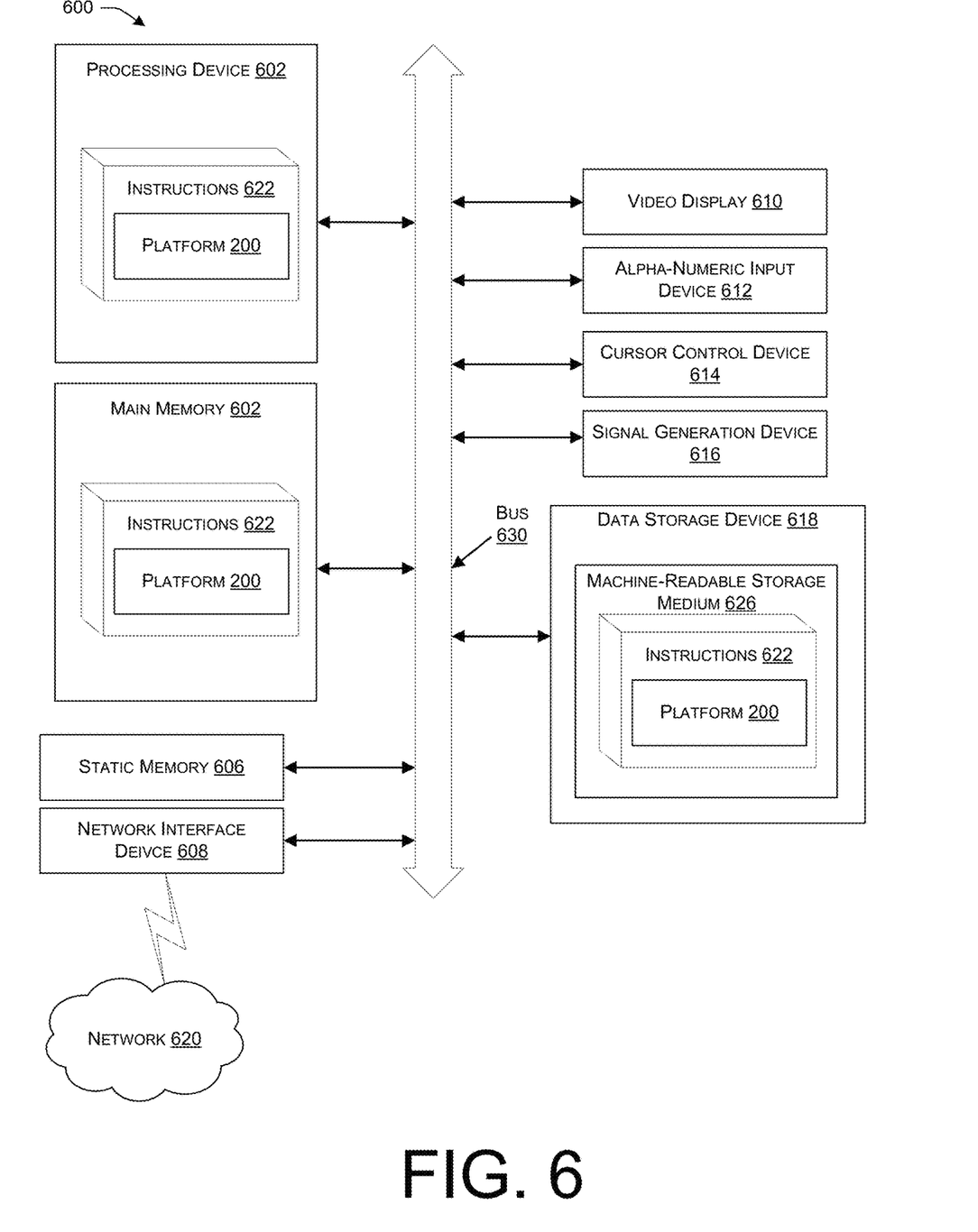
FIG. 6 illustrates is a schematic block diagram that provides one example illustration of a computing device within which a set of instructions, for causing the machine to perform any one or more of the methodologies discussed herein, may be executed.

FIG. 6 illustrates a diagrammatic representation of a machine in the exemplary form of a computer system (computing device) 600 within which a set of instructions, for causing the machine to perform any one or more of the methodologies discussed herein, may be executed. The system 600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions for the platform or engines described herein, embodying any one or more of the methodologies or functions described herein. The instructions may also reside, completely or at least partially, within the main memory 604 and/or within processing logic of the processing device 602 during execution thereof by the computer system 600, the main memory 604 and the processing device 602 also constituting computer-readable media.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "processing", "combining", "verifying", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. In addition, embodiments of the present disclosure are described with reference to Java 8, JML and Open JML. However, it should be understood that the principles and techniques set forth herein may be applied to other programming languages that have both imperative programming features and functional programming features. Accordingly, it will be appreciated that a variety of programming languages may be used to implement the teachings of the embodiments of the disclosure as described herein.

Figure 7:
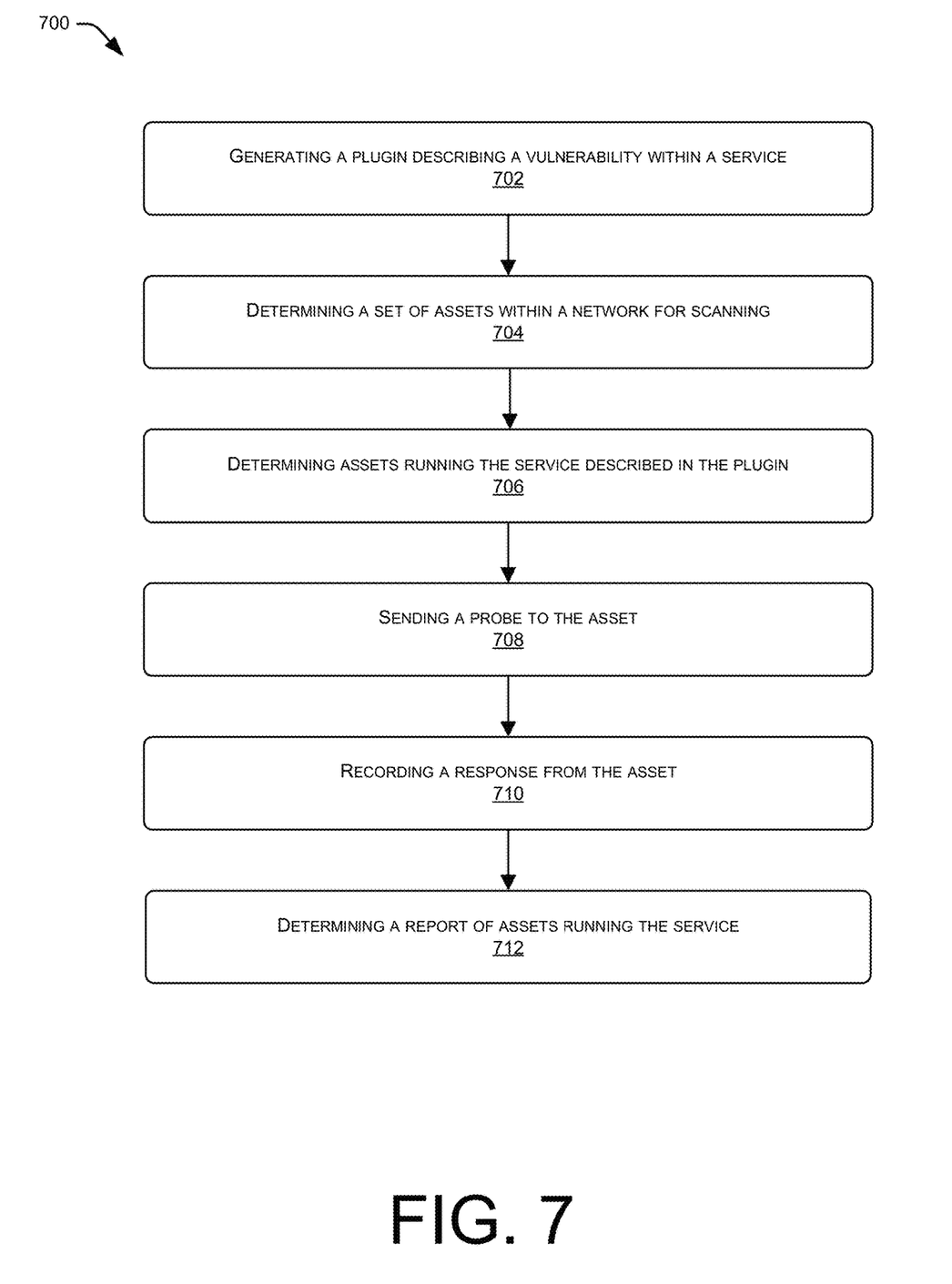
FIG. 7 illustrates an example process for, according to the present description.

FIG. 7 illustrates a flow diagram of a method according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

FIG. 7 illustrates a process 700 for scanning network assets of an organization based on disclosed vulnerabilities. The process 700 may be carried out by a computing system or device, such as the server 110 of FIG. 1 and/or the computing device 600 of FIG. 6.

At 702, the process 700 includes generating a plugin describing a vulnerability within a service. A web-based UI may be used to generate a plugin. The UI may include a web-based UI that may include options to upload information related to the exploit and generate a plugin and/or module that can be used by the platform to scan assets within the network. In some examples, the process may include automating generation of a plugin for identifying the exploit and/or services within assets using the platform. The process 700 may be configured to receive a standard format of the exploit and then may generate code for the plugin that imports the exploit information regarding the applicable service and portion of code of the service.

In some examples, the plugin and/or module may include a target protocol over which a probe is sent to target. For instance, the protocol may include TCP, UDP, RAW, or other such protocols. The module may also include a target service that identifies the service to which the probe will be sent within the network. For example, the target service may include HTTPS, FTP, SSH, RDP, and other such services. The module may also include a class, the main class describing the core functionality of the module. The plugin may also include a main function invoked by the platform for scanning. The plugin may also include return values of the main function.

In some examples, the process 700 may include validating the plugin generated by the development engine 116. The validation may be performed by parsing the plugin to verify if the plugin is written correctly to run on the platform. The validation engine 118 may be configured to estimate and/or simulate performance of the scanning and ensure that the plugin will operate correctly on the platform.

At 704, the process 700 includes determining a set of assets within a network for scanning. In some examples, the process 700 may implement the asset selection engine 120. The asset selection engine 120 may be configured to select assets within the network of the organization. Asset selection engine 120 may iterate through a predefined list of assets that are added to the platform and/or network for monitoring.

The platform may, via the asset selection engine 120, reuse information (e.g. open ports, services running, etc.) about an asset collected when the asset was added to the network and/or platform for monitoring. The asset selection engine 120 may also additionally verify if the service targeted by the plugin is running on the target asset at 706.

If the asset selection engine 120 finds the target service running on an asset, one of the scanning threads of the platform may send a probe to the asset at 708 and save the details of how the asset responded to the probe at 710. The probe may probe how the asset behaves, and in particular how the targeted service and/or vulnerability within the service behaves and responds to the probe. In some examples, such information may be used to identify whether the vulnerability is present within the service based on the response from the asset and/or service.

Because scans developed and implemented using the platform described herein are focused and highly specific to the particular vulnerability, scans can be accomplished quickly, even across large organizations with large numbers of assets running various services. The platform may be hosted in the cloud such that asset scanning loads may be handled by the infrastructure itself such that network operators need not worry about parallel thread management.

At 712, the process 700 includes determining a report of assets running the service. The report may be generated by the reporting engine 122. The reporting engine 122 may prepare a report once all asset scanning is done within the network. The reporting engine 122 may prepare a standard report, such as may be available in a CSV file and may be available for download and/or available through the web-based UI. The platform hosting the development engine 116, the validation engine 118, the asset selection engine 120, and the reporting engine 122 consumes the plugin and may launch a customizable and/or required number of scanning thread to send probes to a predefined list of assets. When scanning is done, the reporting engine 122 generates a report which summarizes the findings of how each and every asset has responded to the probe that was sent.

For example, the platform 200 may enable the network engineer 204 to disable one or more assets or services based on the report. For example, the platform 200 may disable a portion of the targeted service or asset based on the response from the probe, for example when the response from the probe indicates a presence of the exploit or vulnerability. In some examples, the platform 200 may automatically take action against the exploit by disabling the exploited or vulnerable code of the service hosted on the asset automatically.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. An asset scanning system comprising:
   an asset database storing a plurality of asset entries, wherein each asset entry in the asset database is associated with an asset of a network;
   an asset scanning engine in communication with the asset database, wherein the asset scanning engine is operable to:
      generate a plugin using a software development kit, the plugin describing a vulnerability with respect to a service of an asset;
      upload the plugin to a network-based scanning system;
      determine that the plugin is valid or invalid by parsing the plugin;
      in response to determining that the plugin is invalid, generating an alert including an indication of invalidity;
      in response to determining that the plugin is valid, determining a set of assets for scanning;
      determine assets of the sets of assets running the service described in the plugin;
      in response to determining that the service is running on an asset, send a probe to the asset and record a response from the asset; and
      determine a report of assets running the service comprising results of the probe.

2. The asset scanning system of claim 1, wherein the asset database comprises service information describing services running on the assets, and wherein determining assets of the set of assets running the service comprises querying the service information.

3. The asset scanning system of claim 1, wherein the asset scanning engine is further operable to disable an asset or the service running on an asset in response to the report.

4. The asset scanning system of claim 1, wherein the asset scanning engine being operable to generate the plugin comprises receiving input in response to a notification regarding a vulnerability associated with the service and generating, using the software development kit, the plugin.

5. A method comprising:
   generating a plugin describing a component within a service and a vulnerability with respect to the service;
   determining that the plugin is valid or invalid by parsing the plugin;
   in response to determining that the plugin is invalid, generating an alert including an indication of invalidity;
   in response to determining that the plugin is valid, determining a set of assets within a network for scanning;

determining assets of the sets of assets running the service described in the plugin;

sending, in response to determining that the service is running on an asset, a probe to the asset, the probe configured to probe the component or the service;

recording a response from the asset in response to the probe; and determining a report of assets running the service comprising the response.

6. The method of claim 5, further comprising disabling an asset or the service running on an asset in response to the report.

7. The method of claim 5, wherein the plugin comprises service data describing a version of the service associated with the component, and wherein determining the assets running the service comprises determining assets running the version of the service.

8. The method of claim 5, wherein generating the plugin is in response to notification of the component without a scanning signature from a vendor associated with the service.

9. The method of claim 5, further comprising determining an asset database storing a plurality of asset entries, wherein each asset entry in the asset database is associated with an asset of a network.

10. The method of claim 9, wherein the asset database comprises service information describing services running on the assets, and wherein determining assets of the set of assets running the service comprises querying the service information.

11. The method of claim 10, wherein determining the asset database comprises determining the service information based at least in part on data collected when the asset was added to the network.

12. A non-transitory computer-readable medium having instructions stored thereon that, when executed by one or more processors, cause the one or more processors to perform operations comprising:

generating a plugin describing a component within a service and a vulnerability with respect to the service;

determining that the plugin is valid or invalid by parsing the plugin;

in response to determining that the plugin is invalid, generating an alert including an indication of invalidity;

in response to determining that the plugin is valid, determining a set of assets within a network for scanning;

determining assets of the sets of assets running the service described in the plugin;

sending, in response to determining that the service is running on an asset, a probe to the asset, the probe configured to probe the component or the service;

recording a response from the asset in response to the probe; and determining a report of assets running the service comprising the response.

13. The non-transitory computer-readable medium of claim 12, wherein the instructions comprise further instructions that, when executed by the one or more processors cause the one or more processors to perform additional operations comprising disabling an asset or the service running on an asset in response to the report.

14. The non-transitory computer-readable medium of claim 12, wherein the plugin comprises service data describing a version of the service associated with the component, and wherein determining the assets running the service comprises determining assets running the version of the service.

15. The non-transitory computer-readable medium of claim 12, wherein generating the plugin is in response to notification of the component without a scanning signature from a vendor associated with the service.

16. The non-transitory computer-readable medium of claim 12, wherein the instructions comprise further instructions that, when executed by the one or more processors cause the one or more processors to perform additional operations comprising determining an asset database storing a plurality of asset entries, wherein each asset entry in the asset database is associated with an asset of a network.

17. The non-transitory computer-readable medium of claim 16, wherein the asset database comprises service information describing services running on the assets, and wherein determining assets of the set of assets running the service comprises querying the service information.

18. The non-transitory computer-readable medium of claim 17, wherein determining the asset database comprises determining the service information based at least in part on data collected when the asset was added to the network.

\* \* \* \* \*